United States Patent
Lim et al.

(10) Patent No.: US 7,173,781 B2
(45) Date of Patent: Feb. 6, 2007

(54) MULTI-TRACKS MR OFFSET TUNING BASED ON ERROR COUNT IN CERTIFICATION PROCESS

(75) Inventors: TeckKhoon Lim, Singapore (SG); QuekLeong Choo, Singapore (SG); WeiMing Yeow, Singapore (SG); SanYuan Liew, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 227 days.

(21) Appl. No.: 10/607,420

(22) Filed: Jun. 26, 2003

(65) Prior Publication Data

US 2004/0264021 A1    Dec. 30, 2004

(51) Int. Cl.
G11B 27/36 (2006.01)
G11B 5/09 (2006.01)
G11B 5/596 (2006.01)

(52) U.S. Cl. .................... 360/31; 360/53; 360/77.02
(58) Field of Classification Search ............. 360/31, 360/53, 75, 76, 77.02, 77.04, 78.04
See application file for complete search history.

(56) References Cited

U.S. PATENT DOCUMENTS

| | | | |
|---|---|---|---|
| 5,636,075 A * | 6/1997 | Nishimura et al. | 360/48 |
| 5,936,789 A * | 8/1999 | Mukohara | 360/77.04 |
| 6,031,683 A | 2/2000 | Iverson | |
| 6,067,200 A | 5/2000 | Ohba | |
| 6,208,477 B1 | 3/2001 | Cloke | |
| 6,335,850 B1 | 1/2002 | Dunfield | |
| 6,392,830 B1 | 5/2002 | Malone | |
| 6,650,491 B2 * | 11/2003 | Suzuki et al. | 360/31 |
| 6,700,731 B2 * | 3/2004 | Chew | 360/77.08 |
| 6,754,030 B2 * | 6/2004 | Seng et al. | 360/76 |
| 6,819,519 B2 * | 11/2004 | Takaishi et al. | 360/77.02 |
| 2001/0033450 A1 | 10/2001 | Bryant | |

OTHER PUBLICATIONS

U.S. Appl. No. 09/772,578, filed Jan. 30, 2001 Bryant et al.

* cited by examiner

Primary Examiner—Wayne Young
Assistant Examiner—Jason Olson
(74) Attorney, Agent, or Firm—Shumaker & Sieffert, P.A.

(57) ABSTRACT

Embodiments of the present invention include a method and an apparatus for generating an optimal MRO for a zone having a plurality of tracks. A disc drive controller determines the optimum MRO of a zone of tracks by analyzing multiple tracks in the zone with the actuator arm located at a series of offsets relative to the track center. Selected tracks in the zone are written to once. Then the selected tracks in the zone are sequentially read at a first offset, and the corresponding errors recorded. This reading is repeated for each of the offsets until all offsets have been analyzed. Based on the offset, or band of offsets, with the least errors over the selected tracks, the optimum MRO can be selected for the zone. The process can be repeated for each zone and the optimum MRO values stored in an MRO table in the disc drive for use during subsequent read and write operations.

25 Claims, 7 Drawing Sheets

MULTI-TRACKS MR OFFSET TUNING BASED ON ERROR COUNT IN CERTIFICATION PROCESS

FIELD OF THE INVENTION

This invention relates generally to head offset calibration in a disc drive, and, in particular, to measuring optimal reader-to-writer offset of a head for reduced track misregistration (TMR).

BACKGROUND OF THE INVENTION

Disc drives are data storage devices that store digital data in magnetic or optical form on a rotating storage medium called a disc. Modem magnetic disc drives comprise one or more rigid discs that are coated with a magnetizable medium and mounted on the hub of a spindle motor for rotation at a constant high speed. Each storage surface of a disc is divided into several thousand tracks that are tightly packed concentric circles. The tracks are typically numbered starting from zero at the track located outermost the disc and increasing for tracks located closer to the center of the disc. Each track is further broken down into data sectors and servo bursts. A data sector is normally the smallest individually addressable unit of information stored in a disc drive and typically holds 512 bytes of information plus additional bytes for internal use by the drive for track identification and error correction. This organization of data allows for easy access to any part of the discs.

Generally, each storage surface of a disc in a disc drive has associated with it a head for writing and reading data to or from a sector. Each head is mounted at the distal end of an actuator arm that extends toward the disc and pivots about a bearing shaft assembly. The pivoting of the actuator arm is driven by a connected voice coil motor in the disc drive. A read element (or a reader) and a write element (or a writer) are mounted on each head. The reader and writer are separated both laterally and along the longitudinal axis of the actuator arm. The head skew angle, which is the angle between a tangential line to a track and the line drawn along the longitudinal axis of the actuator arm, changes as the head moves from the inner diameter to the outer diameter of the disc, and vice versa. The combination of the separation and the varying head skew angle causes the radial distance between the path of the reader on the disc and the path of the writer on the disc to be variable as the head moves from the inner diameter to the outer diameter of the disc, and vice versa. This varying radial distance between the reader and the writer at any given track is known in the art as the magneto-resistive offset (MRO).

In general, the data storage format of a track is comprised of an alternating sequence of control fields and data fields on a track. Control fields, such as servo fields and address marks, are permanently written to the disc during manufacture and are subsequently read by the disc drive controller to ensure proper positioning of the head, for error correction, and generally to monitor and control the operation of the drive. The data fields store user data and are routinely read and written to during drive operation. There are two common methods for positioning control and data fields on a track. The first method is to write both the control and data fields in line as close to the center of the track as possible. The second method is to write the data fields at an offset from the control fields in order to take into account the presence of the MRO.

The basic difference between the first method and the second method is that the first method requires a micro minijog of the actuator arm during a write operation whereas the second method requires a micro minijog of the actuator arm during a data read operation. For example according to the first method, during a write operation, the reader first reads the address marks and compares them to the target address. If the address read from an address mark matches the target address, the writer writes the data in the data field. However, as soon as a target data field has been identified, the actuator arm must perform a minijog to center the writer over the data field so that the writer can write data centered in the target data field. But during a data read operation, no minijog is needed to center the reader over the data sector as the data fields and control fields are in line.

The second method is just the opposite. In the second method, when the reader is located over the control fields, the writer is also positioned over the data field (as the data field and the control fields are offset by the MRO) and no micro minijog of the actuator arm is required during a write operation. However, just the opposite is required during a read operation, the actuator arm is required to perform a micro minijog to center the reader over the data field after reading a control field.

Accurate measurement of the MRO is crucial since it will impact the disc drive track registration performance. For example, if the actual MRO at a given track is different from the MRO used by the disc drive when offsetting the head, then there is a greater likelihood of a read error due to the read head not being close enough to the data. This is referred to as track misregistration (TMR). TMR generally refers to position errors of the head between the target head position and the actual head position influenced by external disturbances such as disc flutter, runouts, disc vibrations, etc. The reader can read good data (i.e., data that contains no bit error or recoverable bit errors) only on small a portion of the track pitch (or width) of the track, and this portion of the track pitch is generally referred to as the off-track capability (OTC) of the head. For example, the OTC of a disc drive may only be about 10% of the track pitch. Thus, the reader or the writer must be positioned within the OTC (i.e., within the 10% of the track pitch) in order to successfully read information from or write data to the track.

If the MRO used by the disc drive for a specific track is inaccurate, one outcome is that the target head position may not be within the OTC of the head. The other outcome is that the target head position may not be located at the center of the OTC although it may be within the OTC of the head. In such a case, the target head position would still allow the reader to successfully read good data written on the track but would not provide optimal protection against the TMR. This is because the target head position would be located closer to one of the two edges of the OTC, and there exists higher probability that an external disturbance might displace the head beyond the OTC of the head.

Existing methods of calculating MRO are based on the assumption that, for each zone, the tracks are perfectly concentric and that the track pitch is evenly distributed within the zone. Slight variations in track pitch are assumed to be insignificant in comparison to the average track width. These assumptions become less and less valid as disc drive designs continue to incorporate increasing tracks per inch (TPI). Track pitch, inversely proportional to TPI, continues to decrease as disc drive technology advances. Variation in track pitch from track to track has become more critical in disc drive operation since fine jittering during servo writing will cause a higher percentage of disc drive certification failures for high TPI drives with incorrect MROs.

Accordingly there is a need for methods of more precisely calculating MRO that can be used effectively on disc drives with increasing TPI.

SUMMARY OF THE INVENTION

Against this backdrop embodiments of the present invention have been developed. Embodiments of the present invention include a method and an apparatus for generating an optimal MRO for a zone having a plurality of tracks. A disc drive controller determines the optimum MRO of a zone of tracks by analyzing multiple tracks in the zone with the actuator arm located at a series of offsets relative to the track center. Selected tracks in the zone are written to once. Then the selected tracks in the zone are sequentially read at a first offset, and the corresponding errors recorded. This reading is repeated for each of a set of offsets until all offsets have been analyzed. The optimum MRO is then selected for the zone, based on the offset, or band of offsets, with the least errors over the selected tracks. The process can be repeated for each zone and the optimum MRO values stored in an MRO table in the disc drive for use during subsequent read and write operations.

Another embodiment of the present invention is a disc drive controller that can be connected to a disc drive. The controller is operable to determine a MRO for tracks within a zone in disc drive by causing the disc drive to attempt to read data from a set of positions within the track pitch of each of a plurality of selected tracks in the zone. The controller is further operable to calculate the MRO for use by the disc drive when subsequently positioning the head over tracks in the zone based on errors in reading data from the set of positions.

Yet another embodiment of the present invention is a disc drive having a table of MRO values for each zone of tracks in the disc drive. Each MRO value in the table is calculated from a sampling of errors generated by attempts to read a plurality of tracks within each zone at different positions within each track and each MRO identifying an offset from a reference point and the MRO further identifying a position within the tracks that had no read errors.

These and various other features as well as advantages which characterize the present invention will be apparent from a reading of the following detailed description and a review of the associated drawings.

DETAILED DESCRIPTION

Figure 1:
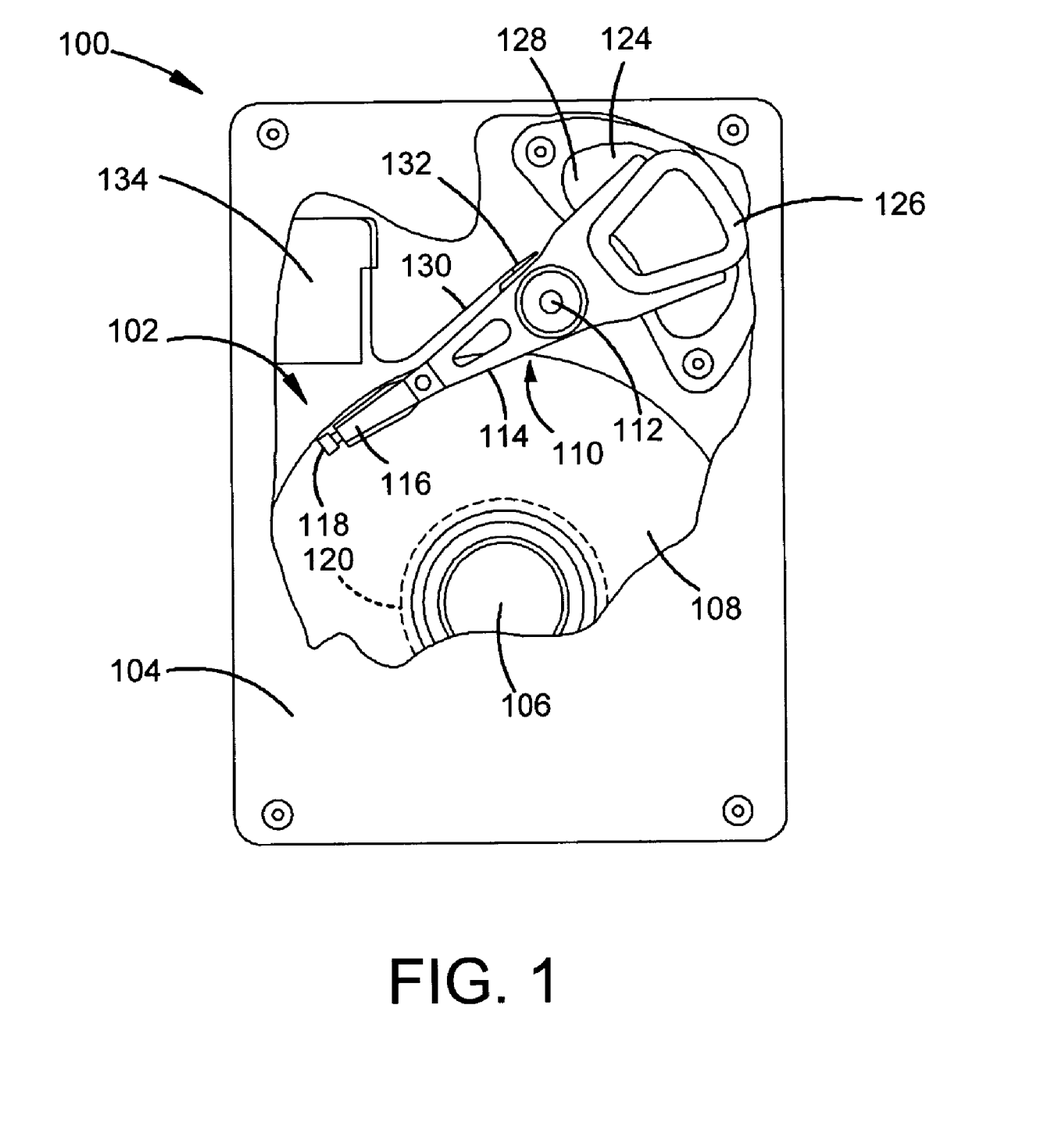
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes a fluid bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
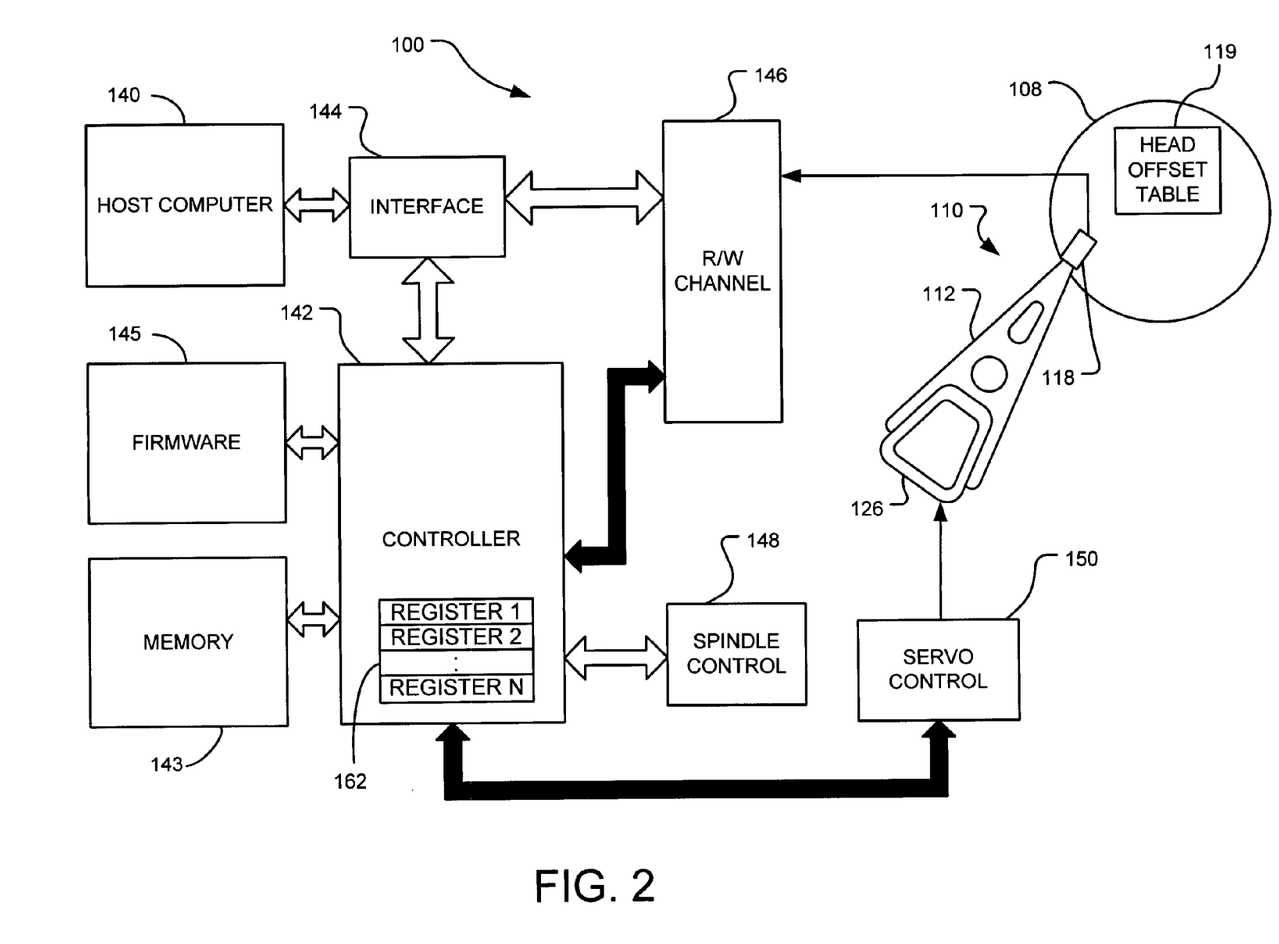
FIG. 2 is a simplified block diagram of a disc drive and its connection to the host computer system including a servo system with which the present invention is particularly useful.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high-speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device. Such operations of the disc drive 100 are well known in the art and are discussed, for example, in U.S. Pat. No. 5,276,662 issued Jan. 4, 1994 to Shaver et al.

Generally, the disc drive interface 144 includes hardware and/or software that regulates transmission of data and manages the exchange of data between the disc drive 100 and the host computer 140. This disc drive interface 144 is contained in the electronics of the disc drive 100. A standard committee such as American National Standard Institute (ANSI) oversees the adoption of an interface protocol by which any peripheral device following the common standard can be used interchangeably. Programming of the firmware 145 follows the disc drive interface protocol.

There are various types of disc drive interface standards such as Small Computer Systems Interface (SCSI), Fibre-Channel-Arbitrated Loop (FC-AL), Serial Storage Architecture (SSA), Advanced Technology Attachment (ATA), Integrated Device Electronics (IDE), CompactFlash, etc. In an embodiment of the present invention, the ATA interface standard is used as an interface between the host computer 140 and the disc drive 100. However, it is well known to those skilled in the art that the same scope and spirit disclosed in an embodiment of the present invention can also be applied to other types of disc drive interfaces listed above.

Figure 3:
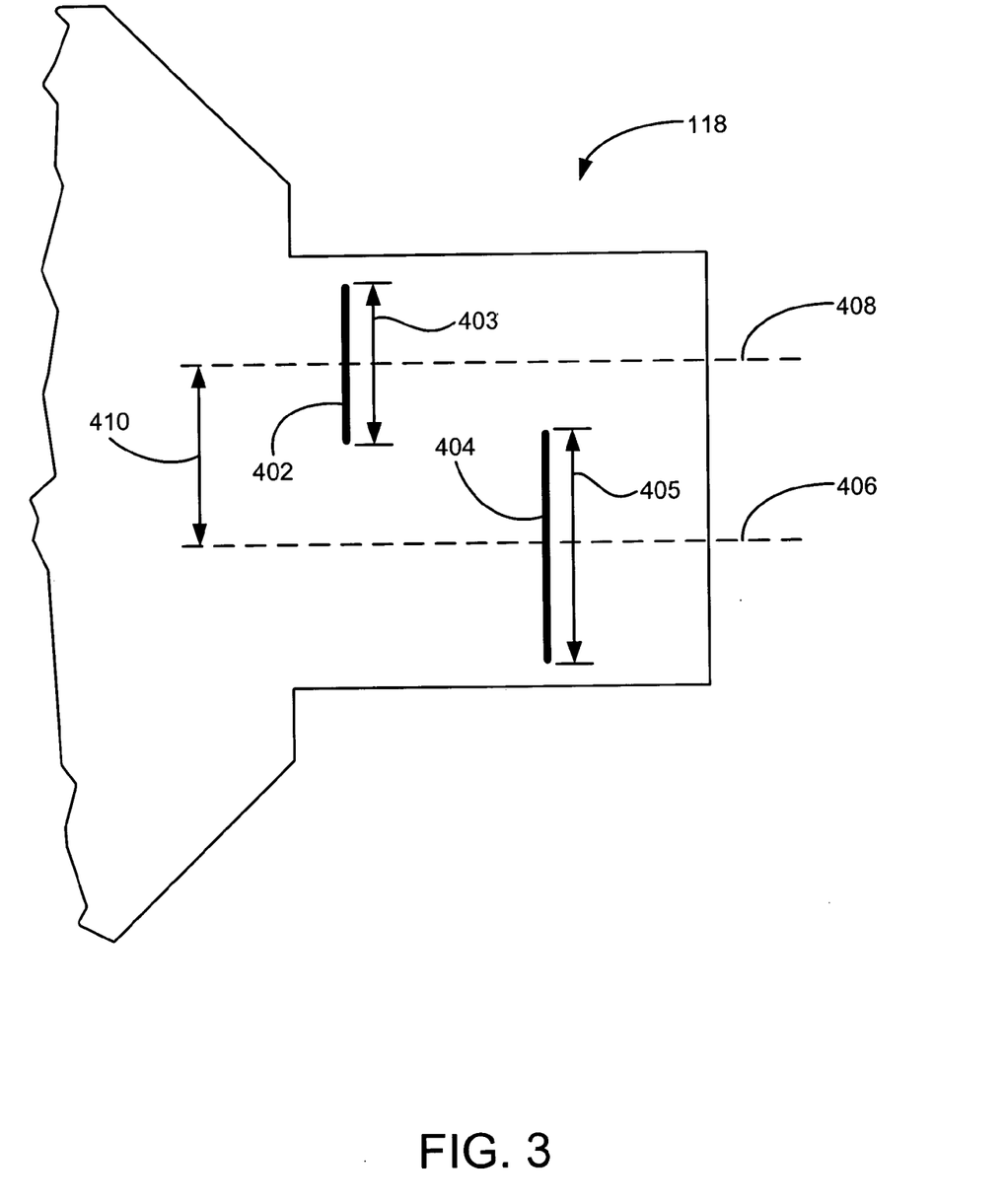
FIG. 3 is a generalized diagrammatic illustration of a portion of a head mounted at the distal end of an actuator arm in a disc drive in accordance with an embodiment of the present invention.

FIG. 3 is a generalized diagrammatic illustration of a portion of the head 118 mounted at the distal end of the actuator arm 114. The head 118 includes a read element (or a reader) 402 and a write element (or a writer) 404. The reader 402 has a width 403 and is centered along its width about a longitudinal centerline 408. The writer 404 also has a width 405 and is centered along its width about centerline 406. In the head embodiment shown in FIG. 3, the reader and writer are separated both longitudinally and laterally. This separation between the reader and writer is known as the reader-to-writer offset. When reading a track, the existence of the reader-to-writer offset requires that the disc drive compensate by varying the position of the arm 114 between reading and writing to tracks. This aspect of varying the arm position to compensate for reader-to-writer offset is further illustrated with respect to FIG. 4.

Figure 4:
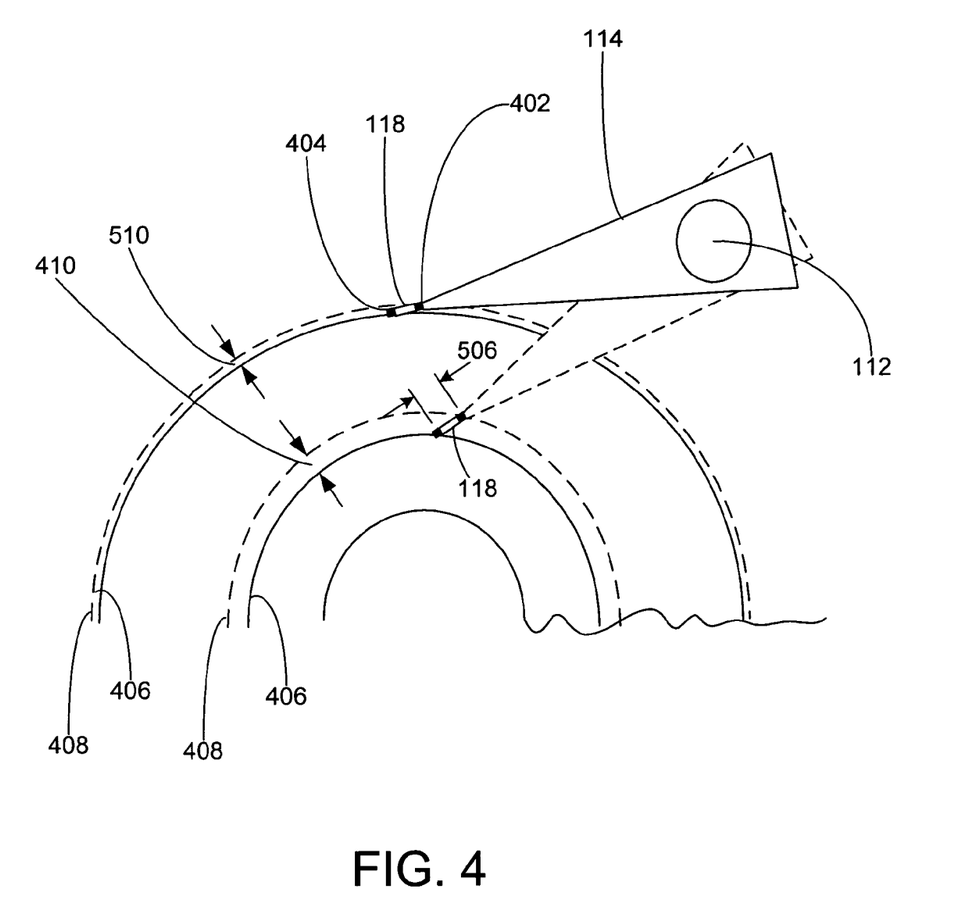
FIG. 4 shows an exaggerated spacing of a separate reader and a writer mounted on the head that is mounted at the distal end of the rotary actuator arm, which pivots about the bearing shaft assembly, to generally illustrate how the MRO varies as the actuator arm radially traverses over the disc.

FIG. 4 shows a separate reader 402 and a writer 404 mounted on the head 118 that is mounted at the distal end of the rotary actuator arm 114, which pivots about the bearing shaft assembly 112. FIG. 4 shows the arm 114 positioned over two different tracks on the disc surface. In the embodiment shown, a reader-to-writer offset 506 along the longitudinal axis of the actuator assembly arm 114 exists between the reader 402 and the writer 404. The head skew angle, which is the angle between a tangential line to a track and the line drawn along the longitudinal axis of the actuator arm 114, changes as the head 118 moves from the inner diameter to the outer diameter of the disc, and vice versa. The combination of the reader-to-writer offset 506 and the varying head skew angle causes the radial distance between the path of the reader 402 (or the centerline 408) and the path of the writer 404 (or the centerline 406) to vary as the head 118 moves from the inner diameter to the outer diameter of the disc 108, and vice versa. The radial distance between the paths of the reader 402 and writer 404 when the arm 114 is positioned over a disc is referred to as the magneto-resistive offset (MRO) 510. As illustrated in FIG. 4, the MRO 510 varies with the position of the arm. This will be true for any given configuration of the reader and writer on the head as long as there is some separation between them.

Figure 5:
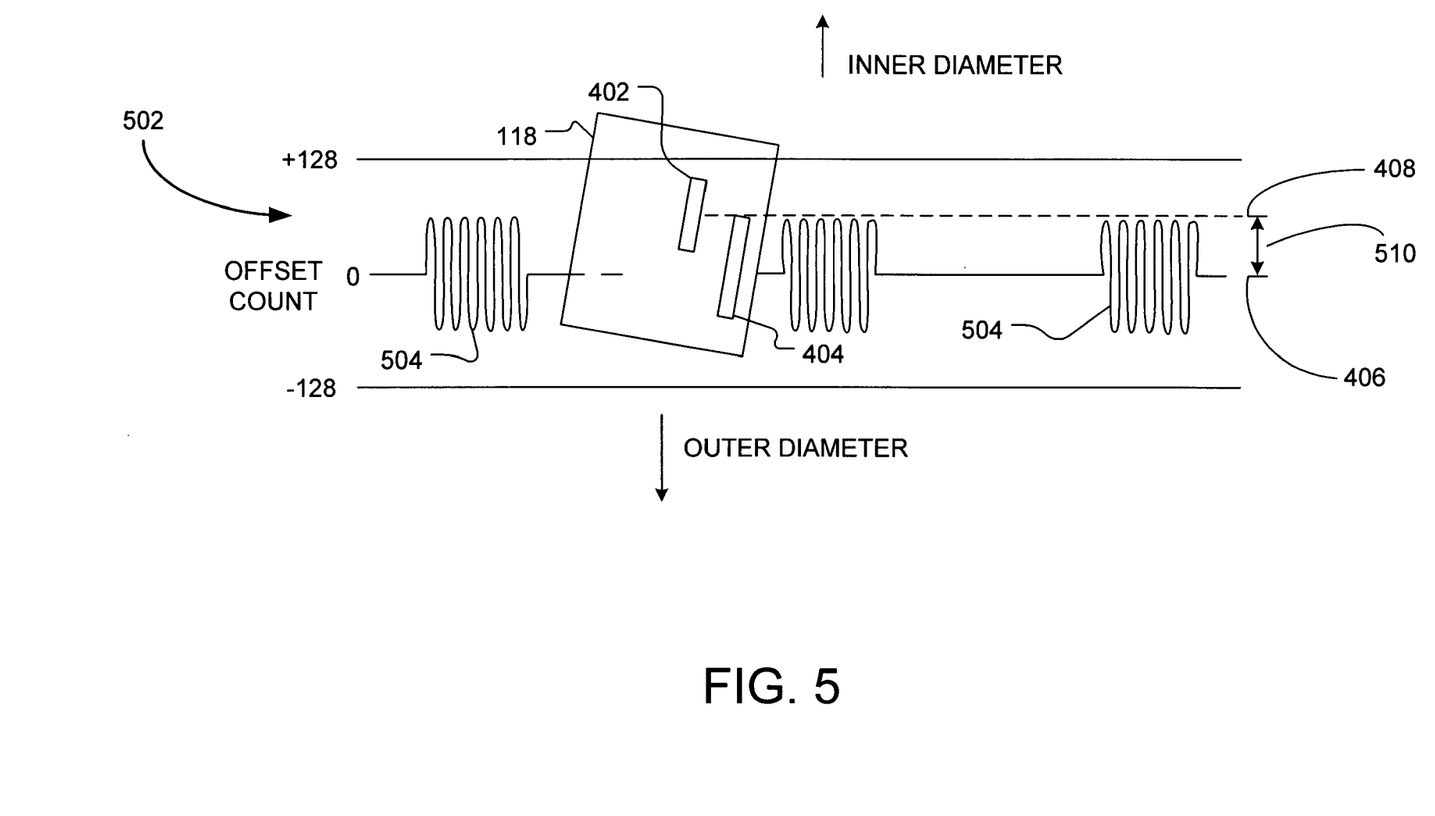
FIG. 5 is an enlarged view of the reader and the writer mounted on the head positioned over a track that is recorded with a signal such as grey code, servo burst pattern, general data, etc.

FIG. 5 is an enlarged view of the reader 402 and the writer 404 on the head 118 over a track 502 that is recorded with a signal 504 (e.g., grey code, servo burst pattern, general data, etc.). In the embodiment shown, the writer 404 is centered over the track. The width of the track 502, also known as the track pitch, is defined by a range of offset counts that spans from +128 to −127, and the center of the track pitch is located at the offset count position 0. The offset counts can be considered a set of positions within a given track pitch. Although the offset count length of 1 is defined as $\frac{1}{256}$ of the track pitch in FIG. 5, the actual length of one offset count is a matter of design choice, and the track pitch can be subdivided into even smaller units of offset count for finer positioning control of the head 118 over the track 502. Alternatively, the track need not be divided into equal offsets and actual length of an offset count could vary. The center of the signal at the offset count position of 0 aligns with the writer centerline 406. At this offset count position of 0, the signal 504 passes directly underneath the center of the writer 404. However, the center of the reader 402 (or the reader centerline 408) is not positioned over the center of the signal 504. The reader centerline 408 is positioned away from the center of the signal 504 by the MRO 510. The reader 402 therefore has to be displaced by the MRO 510 (relative to the disc) in order to read the signal 504 written by the writer 404.

As previously discussed, the MRO 510 for a track varies from one track to another track since the head skew angle varies as the head 118 traverses from inner diameter to outer diameter of the disc, and vice versa. Thus, each track has a different MRO 510. The MRO 510 for each track on the disc therefore has to be determined so that the controller 142 can position the reader 402 over the track centerline for accurate reading of the signal on the track in a manner that produces the least amount of error.

If tracks on a disc were perfectly concentric and shaped, then the MRO 510 could be determined by calculation based on the geometry of the device. However, tracks are neither perfectly concentric, nor are they perfectly shaped. The reality of the track writing process introduces minor variations the width of the track (also referred to as the track pitch). In addition, tracks are rarely perfectly circular or perfectly concentric. Because these imperfections can introduce variations in tracks within zones, the current practice of measuring the MRO 510 of one track in a zone and then mathematically interpolating the MRO 510 for the other tracks within the zone based on the single measurement is not optimum.

Embodiments of the present invention include methods for determining the MRO 510 for tracks in a zone. The methods are preferably performed as part of the disc drive manufacturing process, for example, right after the servo writing process wherein servo bursts are written to the discs.

Figure 6:
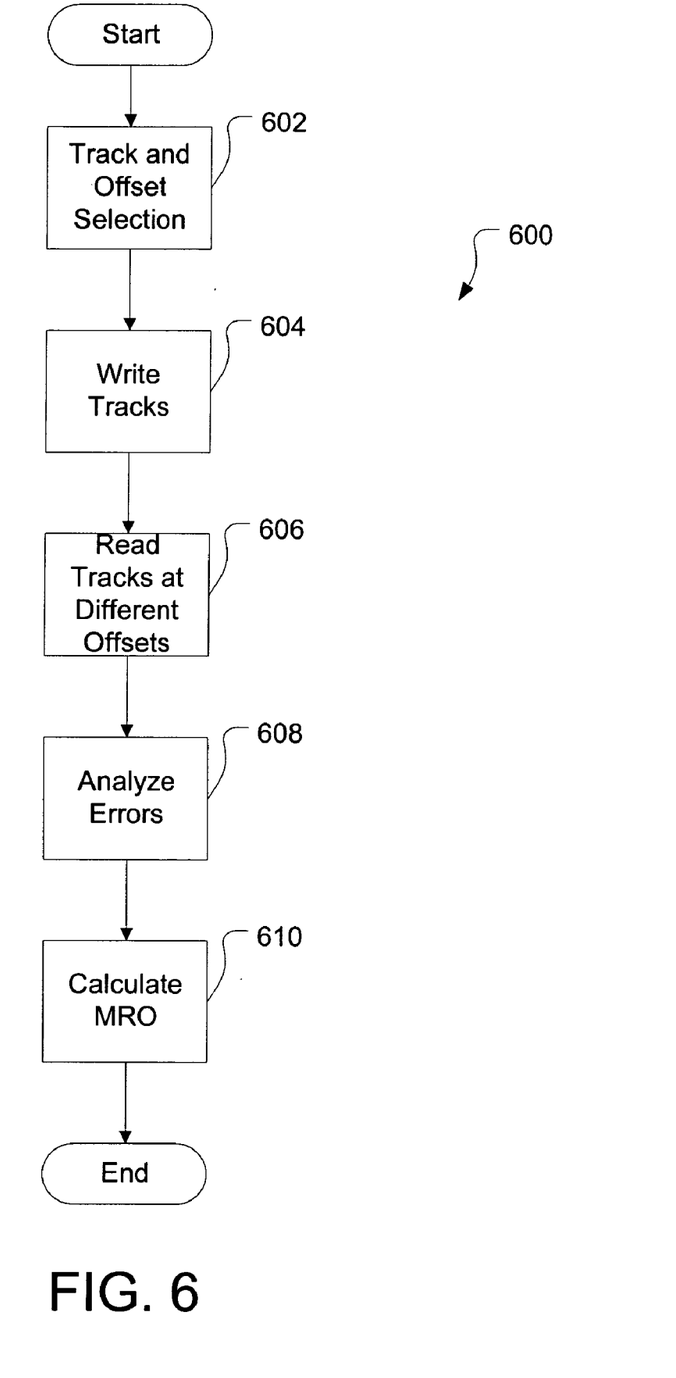
FIG. 6 is a flowchart illustrating operations for determining a MRO for tracks in a zone of tracks in accordance with an embodiment of the present invention.

One embodiment of a method 600 for determining the representative MRO 510 for tracks in a zone is presenting in FIG. 6. For any given zone or other group of multiple tracks, the method starts with a track selection operation 602 that selects some number of predetermined tracks to be tested. For example, in one embodiment 256 evenly spaced tracks are selected from the zone. Alternatively, fewer or more tracks (up to all the tracks in the zone) could be selected, or some non-even distribution of tracks could be selected.

Also as part of the selection operation, the track must be divided into offsets as described with respect to FIG. 5. In the embodiment described in FIG. 5, tracks are divided into 256 evenly spaced offset counts from +128 to −127 with the offset count of 0 being the track center. Alternative embodiments include dividing the track into more offset counts to increase the precision of the MRO 510 or less offset counts to increase the speed of the analysis. It should be noted that this selection operation 602 need only be performed once during the manufacturing process, regardless of the number of drives to be analyzed with this method 600.

A brief digression here is appropriate. The offset counts described above are referenced to the track center. The track center is often defined as the position over the track with the strongest read signal as measured by the reader. This reference point is easily discernable and quickly obtained, so it is the exemplary reference point used in descriptions of embodiments of the present invention. However, the offset counts could just as readily be referenced to some other discernable reference point such as a calculated armature position. Any way of referencing an absolute position within a track can be substituted.

Next, write operation 604 writes some dummy data to each track selected in the selection operation 602. In an embodiment, this includes erasing all data from adjacent tracks to those selected in the selection operation 602. The erasing is helpful as, since later operations will attempt to read data varying offsets relative to the track center, it reduces the chance that data on tracks adjacent to or nearby the selected track do not interfere with the reading operations. In one embodiment of the writing operation 604, six tracks on either side of each selected tracks are erased. In an alternative embodiment, the method 600 is performed just after the initial servo writing process and the disc is presumed to be entirely free of data and no erasing is performed.

After all of the selected tracks are written to by the write operation 604, a read operation 606 sequentially reads each selected track with the read head positioned at each of the offset counts. In one embodiment, the read operation 606 sequentially attempts to read each track at a first offset count, for example offset count −127, and then returns to the first track and sequentially reads each track at a second offset count, repeating the process until an attempt has been made to read all selected tracks at each offset count. Alternative embodiments are also contemplated such as reading the tracks sequentially an offset count −127 and, once complete, starting at the last track reading back to the first at an offset count of +128. Thus alternating both the direction the tracks are read and the offset counts read. Many other sequences are possible.

During the read operation 606, read errors at each offset count on each selected track are recorded or otherwise tracked. For example, if an attempt to read track 124 at offset count −112 resulted in an error, i.e. the data could not be read, that error would then be noted. In one embodiment, these read errors are tracked by offset count, each read error recorded by incrementing a counter for the offset count at which the read error occurred. In the embodiment, upon completion of the read operation 606 the zone will have a table of values consisting of the number of errors for each offset count. Other ways of tracking read errors at each offset count will be immediately suggested to one skilled in the art. For example, an equivalent method would be to track successful read attempts, rather than errors. Any such method for gauging the effectiveness of the read attempt is possible and within the scope of the present invention.

There are many methods for determining when an attempt to read data results in a read error. One common definition of a read error is when an attempt to read a location results in a read signal below some arbitrary error threshold. Other methods are possible and any such methods may be used herein for determining when a read attempt results in a read error.

Figure 7:
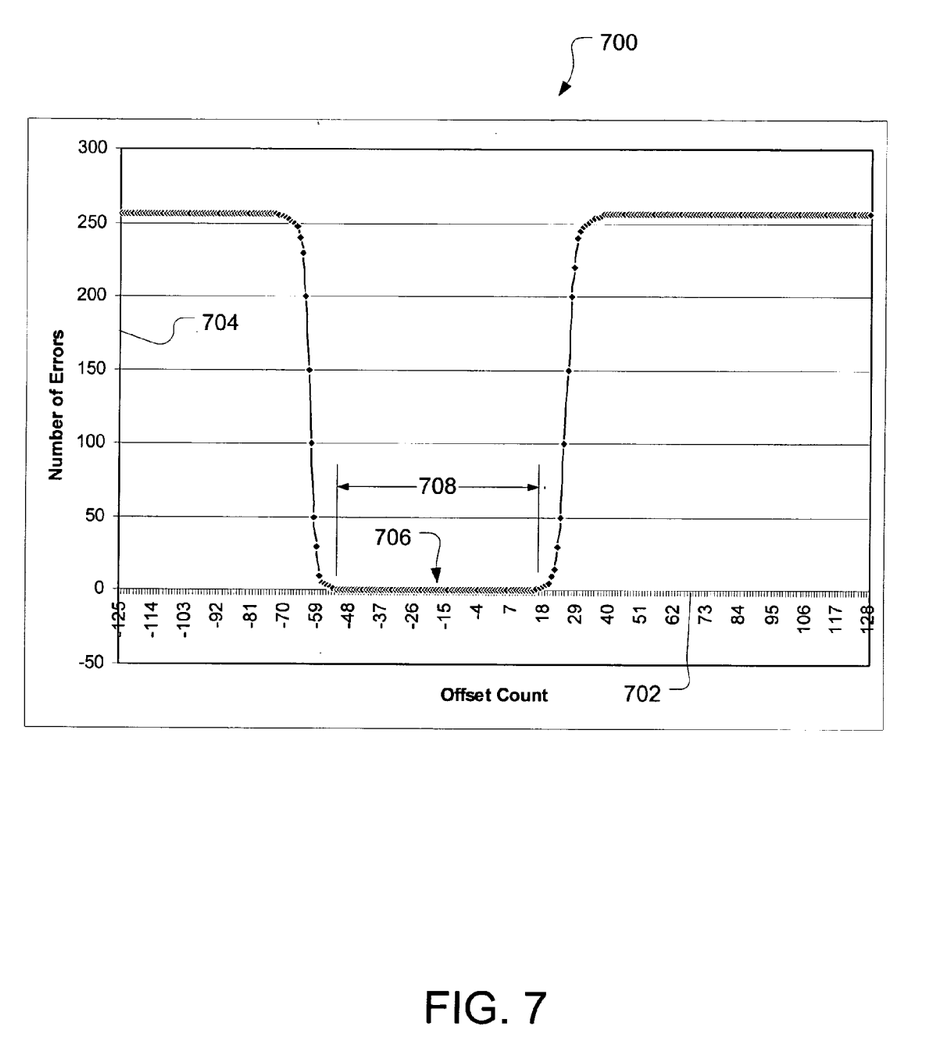
FIG. 7 is a graph of number of read errors versus offset position for an exemplary zone in a disc drive.

A graph 700 of exemplary data from a read operation 606 is shown in FIG. 7 with the horizontal axis 702 showing the offset count and the vertical axis 704 being the number of errors for an offset count. Note that in this embodiment, the possible number of errors will range from 0 (no errors read data at that offset count on any of the selected tracks) to the number of selected tracks (data could not be read from that offset count for any of the selected tracks).

After completion of the read operation 606, an analysis operation 608 analyses the error data and determines an optimum MRO for the zone. The optimum MRO may be determined in different ways. In one embodiment the optimum head position is selected as the center offset count of the range of offset counts with no read errors. Taking the data shown in FIG. 7 as an example, that embodiment of the analysis operation 608 selects the center offset count 706 (approximately offset count −19 in the example data) of the range of offset counts 708 for which there were no errors as the optimum MRO for the zone (approximately from offset count −52 to +15).

Using the center of the region with the least errors will provide the most tolerance for non-repeatable runout (NRRO) errors in head positioning such as those caused by shocks to the drive. Alternative embodiments select the optimum head position based on different criteria. For example, the optimum head position could be selected as the center of the range of offset counts with less than some number of read errors. Alternatively, rather than selecting the center of a range, the optimum head position may be selected as slightly off-center to account for some anticipated increase in NRRO errors in one direction over the other. Many such alternative selection criteria will be immediately suggested to one skilled in the art.

From the selected optimum head position, MRO calculation operation 610 calculates the optimum MRO (as measured from some predefined reference point, which does not necessarily have to be the center of the track as long as the reference point is known and consistently used). This MRO is then stored in an MRO table or some other place on the disc drive for use when accessing data in its associated zone. If there are multiple zones on the disc, the method 600 is repeated for each zone and an MRO for each zone is determined.

A benefit of embodiments of the present invention is the speed at which the methods may be performed. Each track is written to only once in the write operation 604. Each offset count for each track is read only once in the read operation 606. Previous methods utilized a bit error rate method that requires one track in each zone to be read multiple times (often 256 times or more) at each offset count, resulting in similar or longer processing times but returning less accurate estimates of MRO.

Another benefit is that the MRO calculated by embodiments of the present invention are better representations of MRO for the zone than earlier methods. Whereas previous MRO estimation methods were highly dependent on the quality of the single track tested (and required that a perfect or near perfect track be found before testing), embodiments of the present invention are less dependent and, indeed, account for any track pitch variations.

In summary, embodiments of the present invention can be thought of as a method of generating a MRO for use when positioning a head over tracks in a zone. Given that each track has a track pitch, the method includes reading data from a set of positions within the track pitch of each of a plurality of selected tracks in the zone and calculating the MRO for use when subsequently positioning the head over tracks in the zone based on errors identified when reading data from the set of positions. Errors in reading data at each of the pre-determined positions within the track pitch may be recorded or otherwise identified. Embodiments of the method may include selecting tracks within the zone for testing and selecting the positions within the track pitch of a track for testing. Data may be written to the plurality of selected tracks prior to attempting to read data and adjacent tracks may be erased of data. The positions within the track pitch that had the least read errors are determined. The method can include selecting an optimum position within the track pitch from the positions within the track pitch that had the least read errors, calculating the MRO for the zone based on the selected optimum position and a reference point, and storing the MRO for the zone in the disc drive. The method may include attempting to read data from a first position within the set of positions within the track pitch of each of a plurality of selected tracks in the zone and then sequentially repeating the reading act for each of the remaining positions within the set of positions.

Another embodiment of the present invention is a computer-readable medium having computer understandable instructions for a method of generating a MRO for use when positioning a head over tracks in a zone. Given that each track has a track pitch, the method includes reading data from a set of positions within the track pitch of each of a plurality of selected tracks in the zone and calculating the MRO for use when subsequently positioning the head over tracks in the zone based on errors in reading data from the set of positions. Errors in reading data at each of the pre-determined positions within the track pitch may be recorded or otherwise identified. An MRO for the zone is then determined based on the identified errors. Embodiments of the method may include selecting tracks within the zone for testing and selecting the positions within the track pitch of a track for testing. Data may be written to the plurality of selected tracks prior to attempting to read data and adjacent tracks may be erased of data. The positions within the track pitch that had the least read errors are determined. The method can include selecting an optimum position within the track pitch from the positions within the track pitch that had the least read errors, calculating the MRO for the zone based on the selected optimum position and a reference point, and storing the MRO for the zone in the disc drive. The method may include attempting to read data from a first position within the set of positions within the track pitch of each of a plurality of selected tracks in the zone and then sequentially repeating the reading act for each of the remaining positions within the set of positions.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, rather than testing the entire track pitch as described above, some sub-portion of the track width could be tested such as just the center 50% of the total track width. Alternatively, the OTC could be used to determine what portion of the track pitch to test. Numerous other changes may be made which will readily suggest themselves to those skilled in the art and which are encompassed in the spirit of the invention disclosed and as defined in the appended claims.

What is claimed is:

1. A method comprising:
    selecting a plurality of tracks within a zone on a data storage medium;
    reading data from each of a plurality of positions within each selected track;
    determining a number of read errors for each of the plurality of positions;
    identifying an effectiveness of each read at each of the plurality of positions within each selected track based on the read errors; and
    determining a magneto-resistive offset (MRO) for the zone based on the identified effectiveness of each read.

2. The method of claim 1 further comprising:
    writing the data to the selected plurality of tracks prior to reading data.

3. The method of claim 1 further comprising:
    erasing data from tracks adjacent to each of the selected plurality of tracks prior to reading the data recorded on the selected plurality of tracks.

4. The method of claim 1, wherein determining the MRO for the zone further comprises:
    determining one or more of the plurality of positions having a predetermined number of read errors.

5. The method of claim 4, wherein the determining operation comprises:
selecting an optimum position from the one or more of the plurality of positions having the predetermined number of read errors; and
determining the MRO for the zone based on the selected optimum position and a reference point.

6. The method of claim 4, wherein the predetermined number of read errors is a least number of read errors.

7. The method of claim 1, wherein the reading operation comprises:
reading data from a first position within the plurality of positions for each of the plurality of selected tracks; and
repeating the reading act for each of the remaining positions within the plurality of positions for each of the plurality of selected tracks.

8. The method of claim 1, wherein the selected plurality of tracks in the zone includes all of the trucks in the zone.

9. The method of claim 1 wherein each track has a corresponding track width, and wherein the plurality of positions within each selected track cover the track width of the selected track.

10. The method of claim 1 wherein each track has a corresponding track width, and wherein the plurality of positions within each selected track cover a sub-portion of the track width of the selected track.

11. A computer-readable medium having computer-executable instructions for performing steps comprising:
selecting a plurality of tracks within a zone on a data storage medium;
reading data from each of a plurality of positions within each selected tack;
recording read errors for each of the plurality of positions; and
determining a MRO for use when subsequently positioning a head over tracks in the zone based on the read errors.

12. The computer-readable medium of claim 11 further comprising computer-executable instructions for:
writing the data to the selected plurality of tracks prior to reading data.

13. The computer-readable medium of claim 11 further comprising computer-executable instructions for:
erasing data from tracks adjacent to each of the selected plurality of tracks prior to reading the data recorded on the selected plurality of tracks.

14. The computer-readable medium of claim 11 further comprising computer-executable instructions for:
determining one or more of the plurality of positions having a predetermined number of read errors.

15. The computer-readable medium of claim 14 further comprising computer-executable instructions for:
selecting an optimum position from the one or more of the plurality of positions having the predetermined number of read errors; and
determining the MRO for the zone based on the selected optimum position and a reference point.

16. The computer-readable medium of claim 14, wherein the predetermined number of read errors is a least number of read errors.

17. The computer-readable medium of claim 11 further comprising computer-executable instructions for:
reading data from a first position within the plurality of positions for each of the plurality of selected tracks in the zone; and
sequentially repeating the reading act for each of the remaining positions within the plurality of positions.

18. The computer-readable medium of claim 11, wherein the selected plurality of tracks in the zone includes all of the tracks in the zone.

19. A data storage device comprising:
a data storage medium divided into a plurality of zones, each zone having a plurality of tracks;
a transducer for reading data from the plurality of tracks; and
a controller that positions the transducer over a track based on a magneto-resistive offset (MRO) for the track's zone, the MRO previously determined based on read errors for a plurality of positions within each of a selected plurality of tracks within each zone.

20. The data storage device of claim 19, wherein the data storage device is a disc drive and the data storage medium is a magnetic data storage disc.

21. The data storage device of claim 19 further comprising:
a table containing the MRO for each zone.

22. The data storage device of claim 19, wherein the MRO was previously determined by selecting a first one of the plurality of positions having no read errors on any of the selected tracks.

23. The data storage device of claim 19, wherein the MRO was previously determined by selecting a second one of the plurality of positions having no read errors on any of the selected tracks.

24. The data storage device of claim 19, wherein the MRO was previously determined by selecting a first one of the plurality of positions having a least number of read errors on the selected tracks.

25. The data storage device of claim 19, wherein the selected plurality of tracks are all of the plurality of tracks.

* * * * *

UNITED STATES PATENT AND TRADEMARK OFFICE
CERTIFICATE OF CORRECTION

| | | |
|---|---|---|
| PATENT NO. | : 7,173,781 B2 | Page 1 of 1 |
| APPLICATION NO. | : 10/607420 | |
| DATED | : February 6, 2007 | |
| INVENTOR(S) | : TeckKhoon Lim et al. | |

It is certified that error appears in the above-identified patent and that said Letters Patent is hereby corrected as shown below:

Col. 11, Line 33, "each selected tack;" should be --each selected track;--

Signed and Sealed this

Twentieth Day of November, 2007

JON W. DUDAS
*Director of the United States Patent and Trademark Office*